United States Patent Office 3,370,050
Patented Feb. 20, 1968

3,370,050
PREPARATION OF INTERPOLYMERS OF HY-
DROXYL-CONTAINING MONOMERS IN AN
ORGANIC SOLVENT USING HYDROGEN
PEROXIDE AS CATALYST
Jerome A. Seiner, Pittsburgh, Pa., assignor to Pittsburgh
Plate Glass Company, Pittsburgh, Pa., a corporation of
Pennsylvania
No Drawing. Filed June 10, 1964, Ser. No. 374,164
6 Claims. (Cl. 260—80.81)

This invention relates to interpolymers of hydroxyalkyl esters of unsaturated acids and their preparation, and more particularly to an improved method of interpolymerizing such hydroxyalkyl esters with other ethylenically unsaturated monomers using hydrogen peroxide as a catalyst.

Hydrogen peroxide has not been utilized heretofore as a polymerization catalyst in nonaqueous monomer systems of the type described herein. However, its use as a catalyst for the interpolymerization of certain monomer systems containing an unsaturated carboxylic acid amide is disclosed in copending application Serial No. 374,170, filed on the same day herewith.

It has now been found that hydrogen peroxide is also extremely effective as the catalyst for the organic solution interpolymerization of amide-free monomer systems containing a hydroxyalkyl ester of an ethylenically unsaturated carboxylic acid.

Interpolymers of hydroxyalkyl esters of unsaturated acids have been employed for various applications. For example, coating compositions containing such interpolymers are described in United States Patents Nos. 2,681,-897 and 3,084,184. Compositions in which these interpolymers are employed along with other resinous components are advantageously utilized in automotive finishes, appliance finishes, and in similar protective and decorative coatings.

The hydroxyalkyl ester interpolymers utilized in such compositions are ordinarily produced by interpolymerizing the hydroxyalkyl ester with at least one other ethylenically unsaturated monomer in the presence of a catalyst. Heretofore, certain organic peroxide catalysts and azo compounds have been employed for this purpose.

Of those catalysts that have been utilized in the manufacture of these interpolymers, benzoyl peroxide and closely related organic peroxides appear to have been the most satisfactory. Azo compounds such as alpha, alpha'-azobis(isobutyronitrile) have been found to be quite effective and to give products with good properties, but such catalysts frequently cause the reaction to be quite vigorous and difficult to control.

While benzoyl peroxide and similar organic peroxide catalysts provide more controllable reactions, the process still must be carefully regulated, and problems of foaming, localized overheating and excessive exotherms are still frequently encountered. In addition, relatively large amounts of these catalysts are required to achieve adequately high conversions.

Hydrogen peroxide, when employed as the catalyst for interpolymerization of hydroxyalkyl esters of ethylenically unsaturated carboxylic acids with other unsaturated monomers, is substantially more effective than those catalysts previously employed, including those considered to be best and which have been heretofore used in the practice of such processes. In addition to its effectiveness, hydrogen peroxide provides easily controllable reaction and unexpectedly improves not only the properties of the resinous product of the interpolymerization, but also certain properties of the cured films made from coating compositions employing these interpolymers.

Exemplifying the advantages attained by the use of hydrogen peroxide, it has been found that this catalyst is at least twice as effective in interpolymerizing hydroxyalkyl esters as alpha,alpha'-azobis(isobutyronitrile), which was the most effective catalyst for such polymerizations known heretofore, particularly from the standpoint of speed of polymerization, and is about four times as effective as benzoyl peroxide, which has been the most extensively employed catalyst heretofore.

In addition, hydrogen peroxide gives essentially complete conversion in relatively short reaction times, exhibits a uniform and mild exotherm during the polymerization, eliminates foaming and frothing of the reaction mixture, and provides polymers of improved color with negligible catalyst residues remaining therein. Furthermore, the interpolymers obtained, when employed in place of similar interpolymers made with other catalysts in standard coating compositions, provide improved film properties, such as better color after baking at high temperature, and enhanced durability and weatherability.

The hydrogen peroxide employed is commercially available in aqueous solutions. Highly concentrated solutions, e.g., 70 percent to 90 percent, can be used but are more difficult to handle than solutions of lower peroxide content, such as 20 percent to 50 percent; such lower concentrated solutions can be employed and are preferred, for example, in large scale production. The water added with the peroxide can be removed, if desired, by azeotropic distillation or other means during the reaction.

According to this invention, hydrogen peroxide is advantageously used to effect the addition polymerization of any amide-free monomer system containing an appreciable proportion, e.g., about 2 percent or more, of any polymerizable hydroxyalkyl ester of an ethylenically unsaturated carboxylic acid. By "amide-free" is meant monomer systems which do not contain an appreciable proportion, i.e., containing less than about 2 percent, of a polymerizable ethylenically unsaturated amide.

Preferred polymerizations of the class described are those containing hydroxyalkyl esters in which the alkyl group has up to about 12 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl)maleate, bis(hydroxypropyl)fumarate, and similar bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, butadiene-1,3, 2-chlorobutene, alpha-methyl styrene, alpha-chlorostyrene, 2-chlorobutadiene-1,3, 1,1-dichloroethylene, vinyl butyrate, vinyl acetate, allyl chloride, dimethyl maleate, divinyl benzene, diallyl itaconate, triallyl cyanurate, and the like.

Among the most useful interpolymers are those produced from the interpolymerization of one or more hydroxyalkyl esters with one or more alkyl esters of ethylenically unsaturated carboxylic acids or a vinyl aromatic hydrocarbon, or both. These preferred comonomers include ethyl, methyl, propyl, butyl, hexyl, ethyl hexyl, and lauryl acrylates and methacrylates, as well as similar esters having up to about 20 carbon atoms in the alkyl group. Typical vinyl aromatic hydrocarbons are styrene, alpha-alkyl styrene (e.g., methylstyrene), and vinyl toluene.

The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyl toluene, acrylonitrile, methacrylonitrile, methacrylic acid, acrylic acid, 2-ethyl hexyl acrylate, butyl methacrylate, and lauryl methacrylate.

The solvent used as the reaction medium is any organic solvent or mixture of solvents in which the monomers employed are soluble at the temperature of reaction. Aromatic and aliphatic hydrocarbons, alcohols, esters, and other known solvents can be employed. Ordinarily, a solvent is chosen which will reflux at the desired temperature of operation.

The polymerization reaction can be carried out by admixing the hydroxyalkyl ester, the other monomer or monomers, and the catalyst in the solvent, and refluxing the resulting solution for a time sufficient to obtain the desired conversion. Using the improved hydrogen peroxide catalyst of this invention, the polymerization reaction is ordinarily complete in 8 hours or even less. In order to obtain the improved processing and other advantages described above, the temperature of the reaction mixture should be at least about 135° F. during the major part of the polymerization. Above this, any convenient temperature can be employed, although temperatures above about 350° F. are not usually employed. The preferred temperature range is between about 200° F. and about 300° F.

The effectiveness and efficiency of hydrogen peroxide in these systems far surpasses that to be expected in view of its known properties. Because of this effectiveness, very low levels of the catalyst can be employed. Thus, as low as about 0.05 percent by weight, based upon the weight of the monomers in the polymerization mixture, can be used with beneficial results, and the preferred range is from about 0.2 percent to about 2 percent. This is substantially lower than the amount of other catalysts necessary to obtain comparable conversions. Higher amounts, e.g., 5 percent to 10 percent or higher, can be used, but are not usually substantially more effective and may cause difficulties in handling and other problems.

The instant invention is particularly advantageous with monomer systems in which high and sometimes violent exotherms tend to occur and which are thus difficult and dangerous to control. These include those hydroxyalkyl ester monomer systems containing high levels, 50 percent or more, of an alkyl acrylate and those containing even small proportions of acrylonitrile. With such monomer systems, hydrogen peroxide provides an easily controlled reaction without the difficulties which are encountered with conventional catalyst systems.

Presumably, some of the advantages resulting from the use of hydrogen peroxide are at least in part due to the particular type of groups which terminate the polymer chains when it is utilized. The exact nature of these end groups and the manner in which they terminate the chains is not known with certainty, and thus the exact composition of the products which are achieved and which give the improved properties cannot be set forth. However, these properties are especially valuable in coatings produced from the interpolymer manufactured in this manner, and in many instances provide uses which were not heretofore available with these products.

Set forth below are several examples of the method of producing hydroxyalkyl-containing interpolymers with hydrogen peroxide as the catalyst. These examples are given to illustrate the invention and are not to be construed as limitations thereon. All parts and percentages are by weight unless otherwise specified.

*Example 1*

A reaction vessel was charged with 529 parts of xylene and 160 parts of butanol, and heated to reflux. Over a 3-hour period there were added 15 parts of 70 percent aqueous hydrogen peroxide and 400 parts of xylene, along with a mixture of the following:

| | Parts by wt. |
|---|---|
| Styrene | 660 |
| Methyl methacrylate | 215 |
| Ethyl acrylate | 380 |
| Butyl methacrylate | 230 |
| Hydroxypropyl methacrylate [1] | 66 |
| Methacrylic acid | 31 |
| Hydroxyethyl methacrylate | 65 |
| Tertiary-dodecyl mercaptan | 12.4 |

[1] In a mixture containing approximately 40 percent hydroxypropyl methacrylate, 6 percent methacrylic acid and 54 percent xylene.

After the addition was complete, there was added over a period of 15 minutes, 2.4 parts of hydrogen peroxide solution and 66 parts of xylene. The mixture was then refluxed for a total of 6 hours with similar additions being made after the second and fourth hours. Water was azeotropically distilled from the mixture during the last reflux period, a total of 11 parts being removed. At the end of the reaction period, 200 parts of xylene were added, whereupon the product had a solids content of 50.1 percent and a Gardner-Holdt viscosity of T.

*Example 2*

Example 1 was repeated, except that the initial monomer and catalyst addition was made in 2 hours and the total time for the reaction was 6½ hours. The product had a solids content of 50.8 percent and a Gardner-Holdt viscosity of Y.

*Example 3*

A reaction vessel was charged with 734 parts of xylene and 190 parts of butanol, and heated to reflux. The following mixture was then added over a 3-hour period, along with a mixture of 15 parts of 70 percent aqueous hydrogen peroxide and 400 parts of xylene.

| | Parts by wt. |
|---|---|
| Methyl methacrylate | 636 |
| Ethyl acrylate | 456 |
| Butyl methacrylate | 695 |
| Hydroxypropyl methacrylate [2] | 79 |
| Hydroxyethyl methacrylate | 79 |
| Methacrylic acid | 39.5 |
| Tertiary-dodecyl mercaptan | 15 |

[2] Mixture as in Example 1.

At the end of the above addition, there were added over a period of 15 minutes, 3 parts of the hydrogen peroxide solution and 80 parts of xylene. Refluxing was continued for a total of 6 additional hours, with similar catalyst additions being made after the second and fourth hours. Azeotropic distillation during the final reflux period removed 17 parts of water. At the end of the reaction period, 320 parts of xylene were added. The reaction mixture, after cooling, had a solids content of 50.3 percent and a Gardner-Holdt viscosity of $Z_2$.

*Example 4*

Example 3 was repeated, except that in place of the hydroxyalkyl monomers there employed, there was used 200 parts of the ethylene glycol monoester of maleic acid. The solids content of the product was 49.9 percent and it had a Gardner-Holdt viscosity of R.

*Example 5*

Example 4 was repeated, using in place of the ethylene glycol monoester, 200 parts of the dipropylene glycol monoester of maleic acid. The solids content of the product was 48.6 percent and it had a Gardner-Holdt viscosity of M.

*Example 6*

Example 4 was repeated, using in place of the ethylene glycol monoester, 200 parts of the triethylene glycol monoester of maleic acid. The solids content of the product was 48.8 percent and it had a Gardner-Holdt viscosity of M.

It is to be noted that very low levels of catalyst were employed in the above examples, yet in all cases, substantially complete conversion of monomers was obtained in relatively short reaction periods. The comparable reactions using conventional catalysts, such as benzoyl peroxide, require considerably longer reaction times. Further, the above reactions were all smooth and easily controlled with no foaming and no troublesome exotherms. The color of the product in each case was excellent.

Similarly, other amide-free monomer systems as described above are effectively catalyzed by the foregoing catalysts using the procedures exemplified. These may include difficult to handle monomers, such as acrylonitrile, and the polymerizations proceed in an easily controllable manner without difficulty.

In addition to the processing advantages mentioned above, the resins produced and the coating compositions formulated therefrom have the excellent properties, including good gloss, adhesion, and the like, for which hydroxyalkyl ester-containing interpolymers are noted. In addition, compositions produced from interpolymers made with the catalysts described herein exhibit improvement in certain properties which are important in particular uses, such as initial color, color on over-bake, and durability. The interpolymers produced herein are used in the conventional manner and can be pigmented and formulated with the usual pigments, fillers and additives. They are applied to a substrate, generally a metal such as steel or aluminum, and then baked at temperatures usually ranging from about 150° F. to about 300° F. for about 10 to about 45 minutes.

According to the provisions of the patent statutes, there are described above the invention and what are now considered to be its best embodiments. However, within the scope of the appended claims, it is to be understood that the invention can be practiced otherwise than as specifically described.

What is claimed is:
1. In the interpolymerization method which comprises interpolymerizing an organic solvent solution of a mixture of monomers consisting essentially of:
   (a) at least about two percent by weight of a hydroxyalkyl ester of an ethylenically unsaturated carboxylic acid, said ester containing up to about 12 carbon atoms in the hydroxyalkyl group and said acid containing up to about 6 carbon atoms, and
   (b) at least one other ethylenically unsaturated monomer, copolymerizable with said ester and selected from the group consisting of monoolefinic and diolefinic hydrocarbons, halogenated monoolefinic and diolefinic hydrocarbons, unsaturated esters of organic and inorganic acids, esters of unsaturated acids, unsaturated nitriles, and unsaturated acids, the improvement which comprises carrying out the interpolymerization reaction at a temperature between about 135° F. and about 350° F. in the presence of aqueous hydrogen peroxide containing at least about 0.05 percent by weight, based upon the total monomers, of hydrogen peroxide.

2. The improvement of claim 1 in which the amount of hydrogen peroxide is from about 0.2 percent to about 2 percent by weight based upon the total monomers.

3. The improvement of claim 1 in which said hydroxyalkyl ester is selected from the group consisting of hydroxyethyl acrylate, hydroxypropyl acrylate, hydroxyethyl methacrylate, hydroxypropyl methacrylate, and mixtures thereof.

4. The improvement of claim 3 in which a mixture of hydroxyethyl methacrylate and hydroxypropyl methacrylate is used.

5. The improvement of claim 1 in which said hydroxyalkyl ester is an alkylene glycol monoester of an unsaturated dicarboxylic acid.

6. The improvement of claim 1 in which said other ethylenically unsaturated monomer is selected from the group consisting of alkyl acrylates and methacrylates having up to about 20 carbon atoms in the alkyl group, vinyl aromatic hydrocarbons, ethylenically unsaturated nitriles and ethylenically unsaturated carboxylic acids.

References Cited

UNITED STATES PATENTS

| | | | |
|---|---|---|---|
| 1,933,052 | 10/1933 | Fikentscher et al. | 260—2 |
| 2,681,897 | 6/1954 | Frazier et al. | 260—86.1 |
| 3,036,976 | 5/1962 | Sanderson | 260—86.1 |
| 3,172,868 | 3/1965 | Jefferson | 260—86.1 |

OTHER REFERENCES

Nandi et al., J. Pol. Sci., vol 17 (1955), pp. 65–78.

JOSEPH L. SCHOFER, *Primary Examiner.*

H. WONG, *Assistant Examiner.*